United States Patent [19]

Harmon

[11] Patent Number: 5,400,622

[45] Date of Patent: * Mar. 28, 1995

[54] LOCKING DEVICE FOR FLOPPY DISK DRIVE

[75] Inventor: Thomas J. Harmon, Bel Air, Md.

[73] Assignee: Leonard Bloom, Towson, Md.; a part interest

[ * ] Notice: The portion of the term of this patent subsequent to Feb. 21, 2012 has been disclaimed.

[21] Appl. No.: 60,608

[22] Filed: May 11, 1993

[51] Int. Cl.⁶ ............................................. E05B 73/00
[52] U.S. Cl. ................................... 70/14; 70/58; 70/164
[58] Field of Search ................... 70/14, 58, 54–56, 70/158, 163, 164, 423, 424; 360/137

[56] References Cited

U.S. PATENT DOCUMENTS

| | | | |
|---|---|---|---|
| 934,928 | 9/1909 | Michel | 70/423 |
| 2,383,397 | 8/1945 | Lofqwist | 70/424 |
| 3,090,115 | 5/1963 | Carr | 411/500 X |
| 4,085,599 | 4/1978 | Fischer et al. | 70/DIG. 63 X |
| 4,106,315 | 8/1978 | Dohanyos | 70/56 |
| 4,527,405 | 7/1985 | Renick et al. | 70/14 |
| 4,680,949 | 7/1987 | Stewart | 70/58 X |
| 4,822,671 | 4/1989 | Carper et al. | 411/501 X |
| 4,924,683 | 5/1990 | Derman | 70/58 X |
| 5,109,683 | 5/1992 | Cartwright | 70/58 X |
| 5,189,582 | 2/1993 | Hanson et al. | 360/132 |

FOREIGN PATENT DOCUMENTS

| | | | |
|---|---|---|---|
| 1085107 | 1/1955 | France | 70/14 |
| 2824796 | 12/1978 | Germany | |
| 413366 | 4/1946 | Italy | 70/55 |
| 14095 | 11/1904 | Norway | 70/424 |
| WO85/05725 | 12/1985 | WIPO | 70/58 |

OTHER PUBLICATIONS

Photocopy of packaging for "File LOK I".
Photocopy of packaging for "File LOK II".
IBM Technical Disclosure Bulletin: Lock for Magnetic Disk Drive Units, vol. 15, No. 9, Feb. 1973.
IBM Technical Disclosure Bulletin: Security Locks for Diskette Drives, vol. 28, No. 2, Jul. 1985.
IBM Technical Disclosure Bulletin: Security Device for a Disk Drive, vol. 30, No. 8, Jan. 1988.

Primary Examiner—Lloyd A. Gall
Attorney, Agent, or Firm—Leonard Bloom

[57] ABSTRACT

A simple and inexpensive locking device for preventing unauthorized access to a computer disk drive. The disk drive lock employs a pair of slats 10, 20 which are pivoted at a hinge 22 for jackknife folding, the slats 10, 20 both being formed with lock-holes 24, 26 spaced from the hinge 22 and alignable by unfolding the slats 10, 20 to an open position. The disk drive lock may be inserted into virtually any conventional computer disk drive. Once inserted, the slats 10, 20 may be pivoted open and a padlock 30 inserted through the aligned locking holes 24, 26 to lock the device in the open position, thereby preventing removal from the disk drive and thwarting unauthorized access.

8 Claims, 5 Drawing Sheets

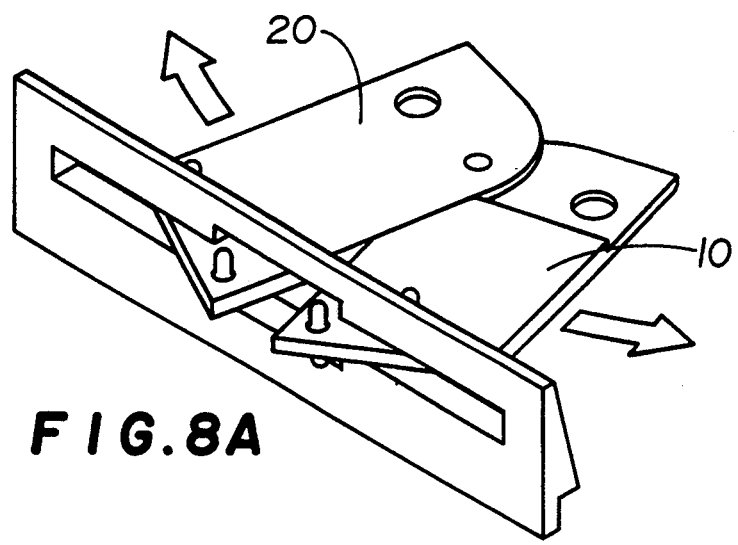
FIG. 8A
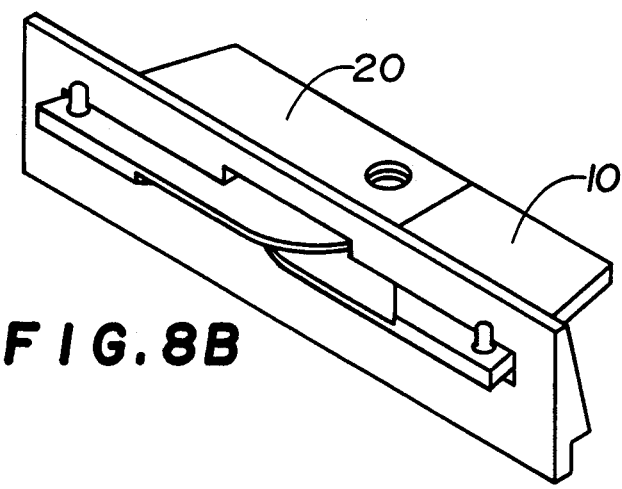
FIG. 8B
FIG. 9
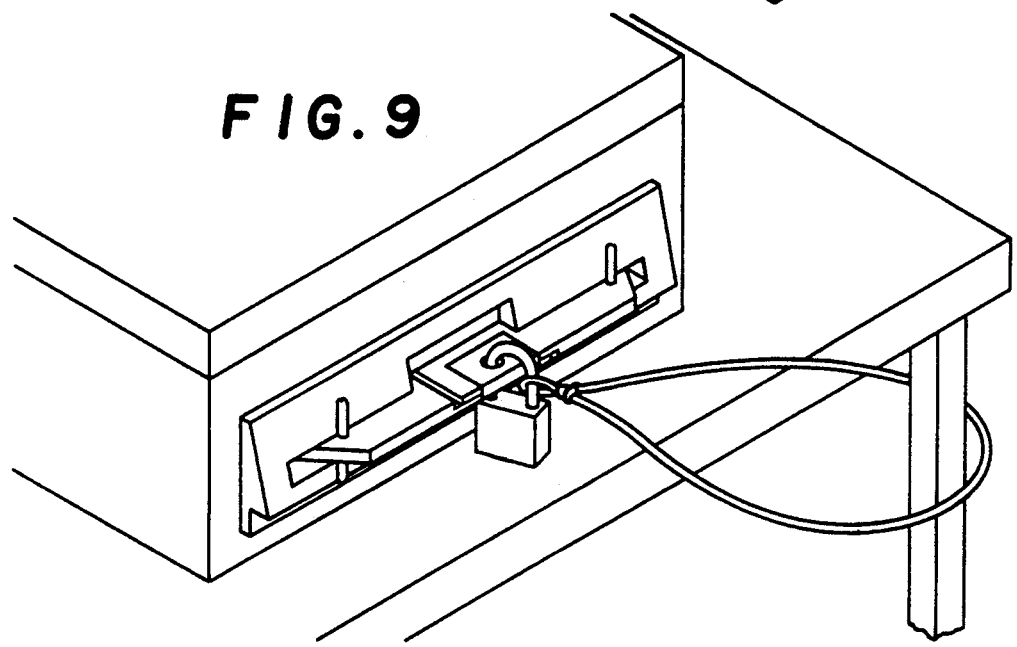

LOCKING DEVICE FOR FLOPPY DISK DRIVE

BACKGROUND OF THE INVENTION

1. Field of the Invention

The present invention relates to computer security and, more particularly, to a locking device for a computer disk drive which prevents unauthorized access thereto.

2. Description of the Prior Art

An ever-present concern with computers and computer systems is mass-storage (or the lack thereof). New memory hungry software programs need large amounts of free memory to run properly, and multi-user LAN systems generate reams of data all of which must be stored. This has generated a huge demand for higher capacity storage, and hard disk drives and other storage devices are quickly evolving to meet the demand. Nevertheless, the amount of data stored in a computer inevitably climbs to capacity. This creates a two-fold problem. First of all, the stored data often includes personal data or data which is proprietary to a business. For instance, stored mailing lists, financial data, etc. may be the key to a competitive edge in the marketplace. The sensitivity of such data calls for appropriate security measures to keep it from the wrong hands. Currently, there is no reliable way to prevent an insider from copying sensitive data onto floppy disks.

On the flip side, there is no reliable way to prevent copying from a floppy disk onto a computer or system. Hence, users are typically free to download disks onto a computer. Typically, the amount of free disk space is quickly consumed by games and other unnecessary data.

Ready solutions already exist to both of the above-described problems. For instance, most desktop computers are equipped with keyed power switches. However, this prevents access to the entire computer. It is often desirable to allow limited access. For instance, employers need to allow employees to operate their computers but would rather not allow downloading of proprietary data or uploading of extraneous data. Such data transfer can be prevented by making the disk drive inaccessible.

There have been efforts to devise locking devices for disk drives. For instance, IBM Technical Disclosure Bulletin Volume 30, No. 8 (January, 1988) proposes three keyed locks all of which employ a swinging arm or shield which is pivoted into position within the disk drive to obstruct the aperture of the drive. Unfortunately, the publication suggests a trade-off between cost and security. The least expensive device suggested by the publication is also the least secure, and it is fairly easy to pry the lock away from the disk drive. The two more effective locks are very complex or must be built into the disk drive as OEM equipment.

IBM Technical Disclosure Bulletin Volume 28, No. 2 (July, 1985) proposes a general concept for a disk drive lock which is based on a keyed retractable bolt. This is a more practical approach, but the details of the retractable bolt are not given. In practice, there is no known cost-effective way to produce the necessary retractable bolt.

There remains a significant demand for an inexpensive disk drive locking device which makes no compromise in terms of security.

SUMMARY OF THE INVENTION

It is, therefore, an object of the present invention to provide a locking device for a disk drive which can be manufactured and sold at least cost, yet provides reliable security for computer disk drives.

It is another object of the invention to provide a locking device as described above which is based on an operational principle that can be adapted for disk drives of any size or make.

It is still another object to provide a locking device as described above which is substantially tamper-proof and cannot easily be pried, cut, or otherwise forcibly removed from the disk drive.

It is a further object to provide a locking device as described above which permits key access to the disk drive via a conventional padlock.

According to the present invention, the above-described and other objects are accomplished by providing a locking device for conventional computer disk drives which prevents unauthorized access thereto.

The locking device includes a first slat which is pivotally hinged to a second slat for jackknife folding. Both slats are formed with lock-holes which are offset from the hinge. The lock holes are alignable by unfolding said slats to a fully open position. The locking device may be inserted in a closed (folded) configuration into a disk drive, and then unfolded to the fully open position. This captures the locking device within the disk drive and aligns the locking holes. A padlock may then be inserted through the locking holes to secure the locking device in the open configuration and trapped inside the disk drive. Consequently, a key is needed for removal of the device and unauthorized access to the disk drive is prevented.

In the preferred embodiment, a pair of retaining pins protrudes transversely from the slats each at the end of a corresponding slat opposite the hinge. The length of the retaining pins is such that they fit within the enlarged central area of the disk drive aperture. When the slats are open inside the disk drive, the retaining pins become captured therein behind the lateral areas of the aperture (which have reduced clearances). In addition, a pair of insertion pins are provided each protruding transversely from a corresponding slat proximate the retaining pin. The insertion pins are of greater extent than said disk drive aperture and thereby limit insertion of the locking device.

An optional perforated clip formed of hardened steel or the like may be inserted over the overlying slats and around the locking holes to reinforce the slats against cutting.

In addition, a binding such as a chain or cable may be employed with the padlock to secure the computer to a nearby fixture.

BRIEF DESCRIPTION OF THE DRAWINGS

Other objects, features, and advantages of the present invention will become more apparent from the following detailed description of preferred embodiments and certain modifications thereof when taken together with the accompanying drawings in which:

FIGS. 7A–C and 8A–B are sequential illustrations from the top and bottom, respectively, showing a three-step insertion sequence of the disk drive lock of the present invention; and FIG. 9 illustrates how a chain or cable may be used in conjunction with the present invention for securing the computer to virtually any nearby fixture.

DETAILED DESCRIPTION OF THE PREFERRED EMBODIMENT

Figure 1:
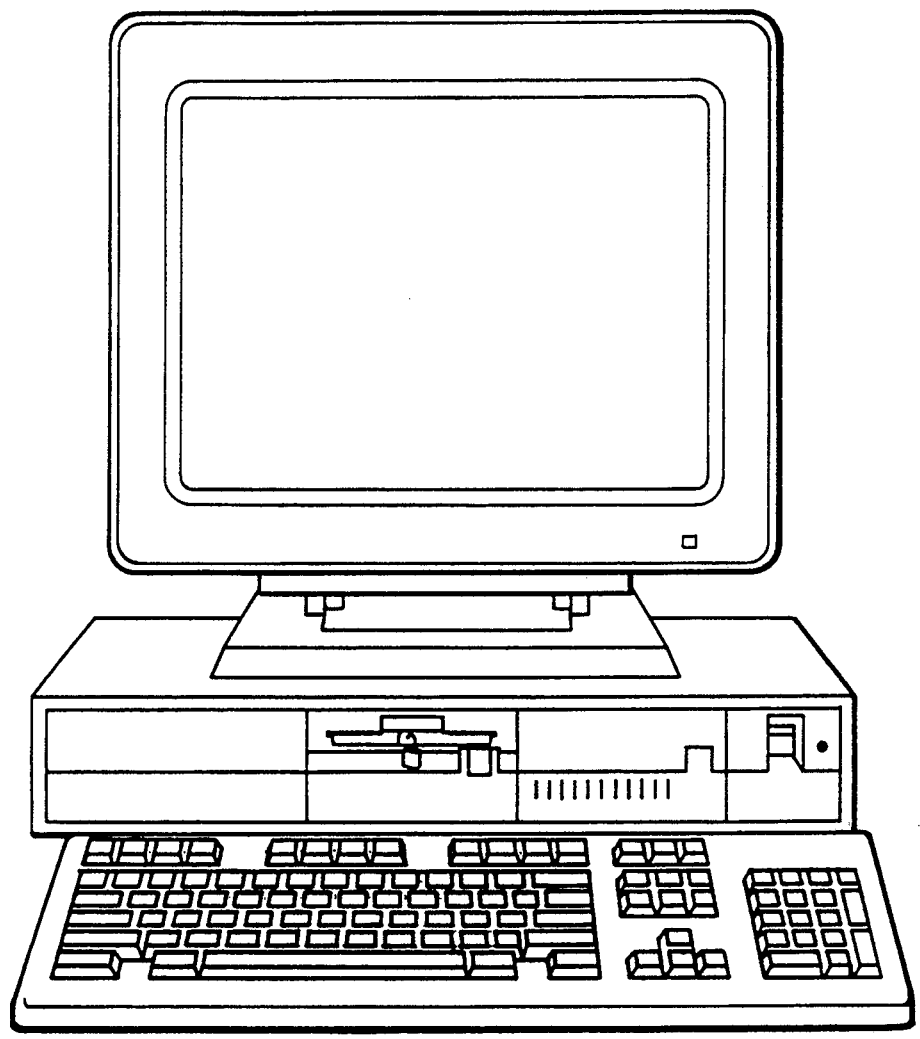
FIG. 1 is a partially enlarged perspective view showing a disk drive locking device according to the present invention installed in a conventional desk-top personal computer.
Figure 1A:
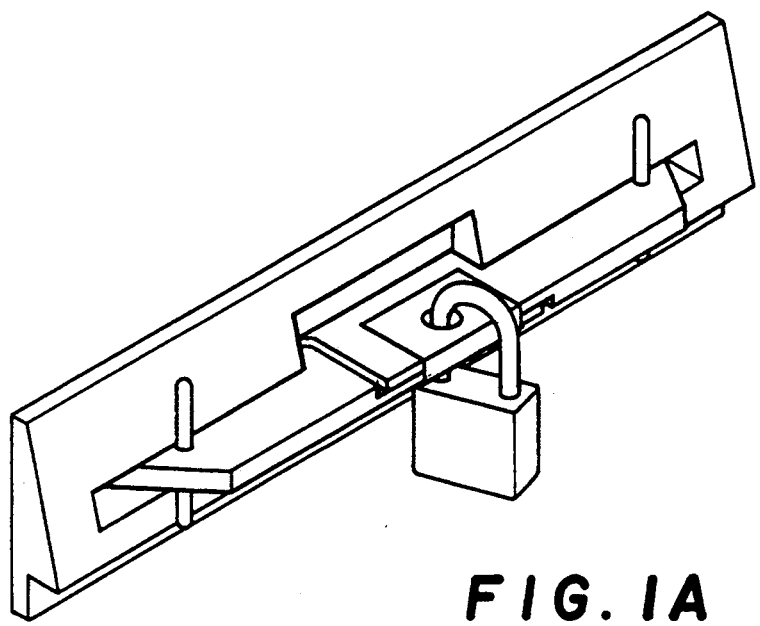

FIG. 1 is a partially enlarged perspective view showing a disk drive locking device according to the present invention installed in a conventional desk-top personal computer for preventing unauthorized access to the disk drive.

The illustrated disk drive is a 3½ inch drive. However, it should be understood that the invention is equally applicable to 5¼ inch drive as well as any other size drive.

Figure 2:
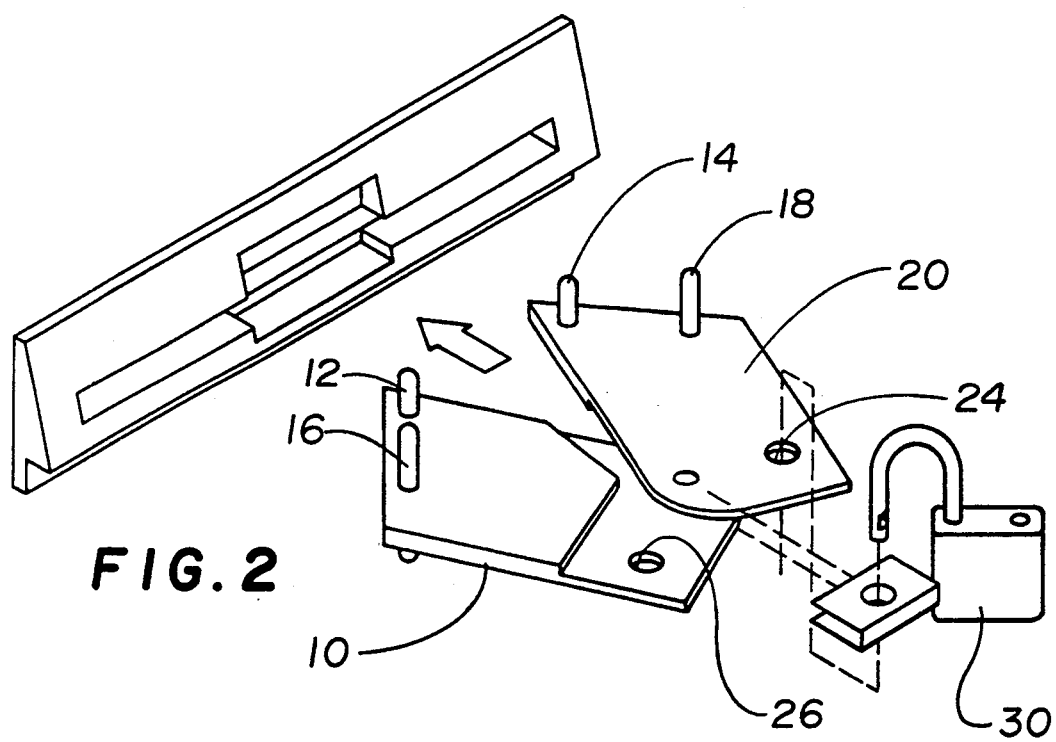
FIG. 2 is an enlarged perspective view showing the disk drive locking device of FIG. 1 as it is inserted into a disk drive.

FIG. 2 is an enlarged perspective view showing the disk drive locking device of FIG. 1 as it is inserted into a disk drive. The disk drive locking device includes a pair of elongate jackknife type slats 10 and 20 pivoted together at one end. The slats 10 and 20 close along a common edge and are pivoted at a hinge 22. Hinge 22 is offset to one side of slats 10 and 20 toward the common edge. Each slat 10 and 20 also has a locking hole 26 and 24, respectively, located at the pivoted end on the opposite side of hinge 22. Each slat 10 and 20 is provided with both an internal pin 12, 14 and an external pin 16, 18, respectively. A conventional miniature padlock 30 is employed to allow keyed removal of the disk drive lock. The disk drive lock is inserted into the disk drive while in the illustrated folded position and in the direction of the arrow.

Figure 3:
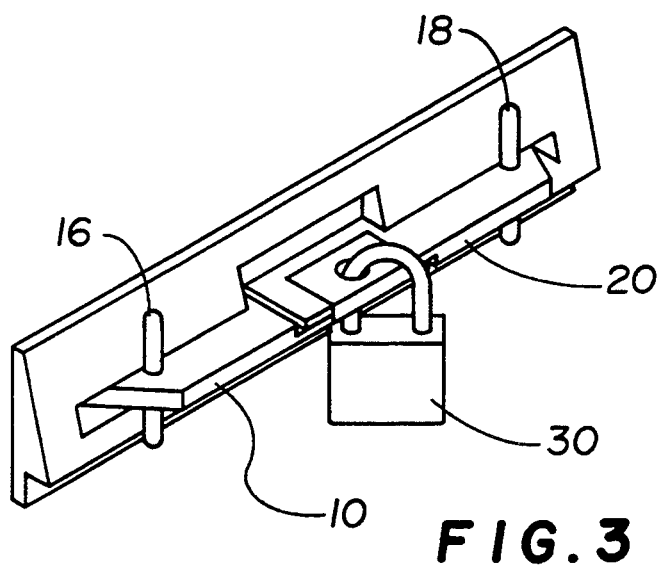
FIG. 3 is an enlarged perspective view showing the disk drive locking device of FIGS. 1 and 2 fully inserted and locked in the disk drive.

FIG. 3 illustrates the inserted and secured disk drive lock. The slats 10 and 20 of the disk drive lock are pivoted apart to a fully opened position. The internal pins 12 and 14 become captured within the disk drive while the external pins 16 and 18 remain outside the disk drive. In the fully opened position, the holes 24 and 26 become aligned to form an eye, and the shank of padlock 30 can be inserted therethrough and locked to prevent removal of the disk drive lock. As long as the disk drive lock remains in the disk drive there can be no use of a floppy disk. However, the computer is otherwise fully operational. Hence, the disk drive lock serves only to prevent unauthorized data transfer to/from outside the computer. In practical terms, the disk drive lock can be employed to prevent others from copying confidential information, or from downloading games and useless data onto the system.

Figure 4:
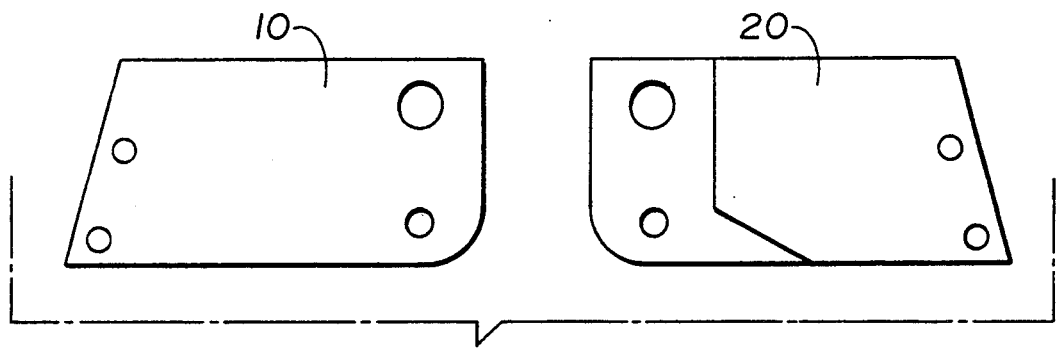
FIGS. 4 and 5 are a detailed top view and side perspective view, respectively, illustrating slats 10 and 20 of the locking device.
Figure 5:
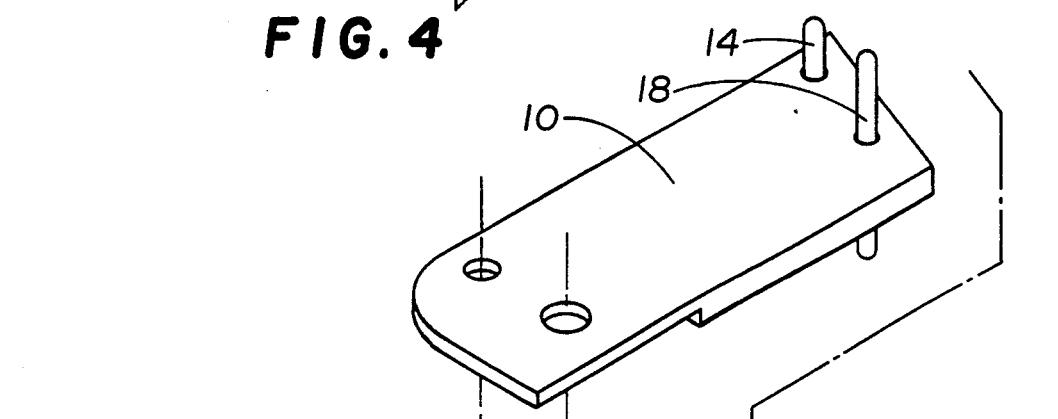

FIGS. 4 and 5 are detailed illustrations of slats 10 and 20. The two slats 10 and 20 are substantially identical, and it is possible to fabricate both in a single mold. The slats 10 and 20 are substantially flat and, for maximum strength, are formed into two tiers. The area around the hinge 22 is recessed and is preferably half the thickness of the outlying areas of slats 10 and 20. This way, when slats 10 and 20 are pivoted together at hinge 22, the entire assembly is of uniform thickness.

The slats 10 and 20 may be pivoted together by any suitable means such as an eyelet or a rivet.

The internal pins 12 and 14 and the external pins 16 and 18 may be integrally formed on slats 10 and 20, or they may be separately formed and inserted through the respective slats 10 and 20 at the tips opposite hinge 22. All pins 12, 14, 16, and 18 are located at the front edge of slats 10 and 20, the internal pins 12 and 14 being toward the common edge and the external pins 16 and 18 being near the opposite edges. In addition, the internal pins 12 and 14 are spaced slightly further from the hinge 22 than the external pins 16 and 18. The internal pins 12 and 14 protrude equally on both sides of the respective slats 10 and 20, as do the external pins 16 and 18. However, the external pins 16 and 18 are slightly longer. The extent of the internal pins 12 and 14 is calculated to allow them to be inserted through the center opening in a conventional disk drive. External pins 16 and 18 are longer so that they cannot be inserted into the disk drive. This way, the external pins 16 and 18 serve to limit insertion.

Figure 6:
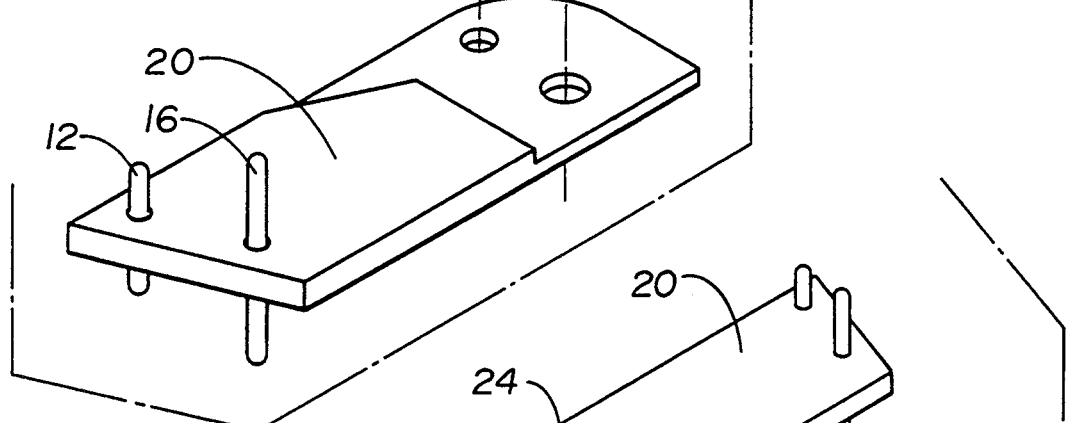
FIG. 6 is a perspective view of an optional metal clip 50 used to reinforce the slats 10 and 20 of FIGS. 4 and 5 against cutting.
Figure 6:
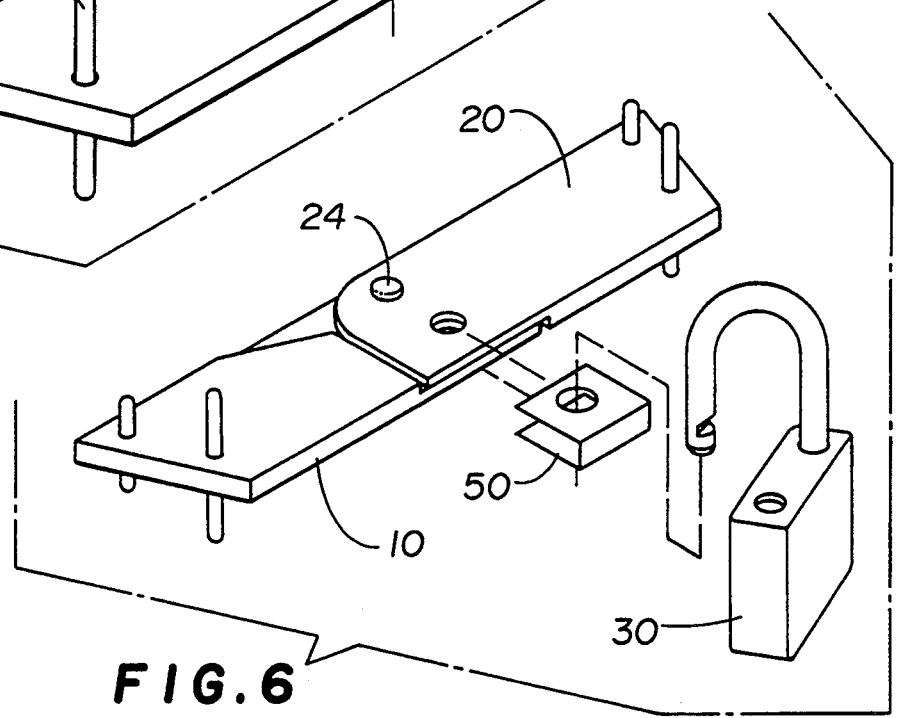

As shown in FIG. 6, an optional metal clip 50 may be provided to discourage cutting of the disk drive lock after padlock 30 has been applied. When the slats 10 and 20 are joined together and are extended into the fully opened position such that holes 24 and 26 overlap, clip 50 slides over the front edge of the overlying slats 10 and 20. Clip 50 is formed with a U-shaped cross-section and two holes in the walls thereof which may be aligned with the holes 24 and 26 on the respective slats 10 and 20. Preferably, clip 50 is formed of hardened metal or the like to deter cutting through the molded plastic slats 10 and 20 by wire-cutters or the like.

Figure 7A:
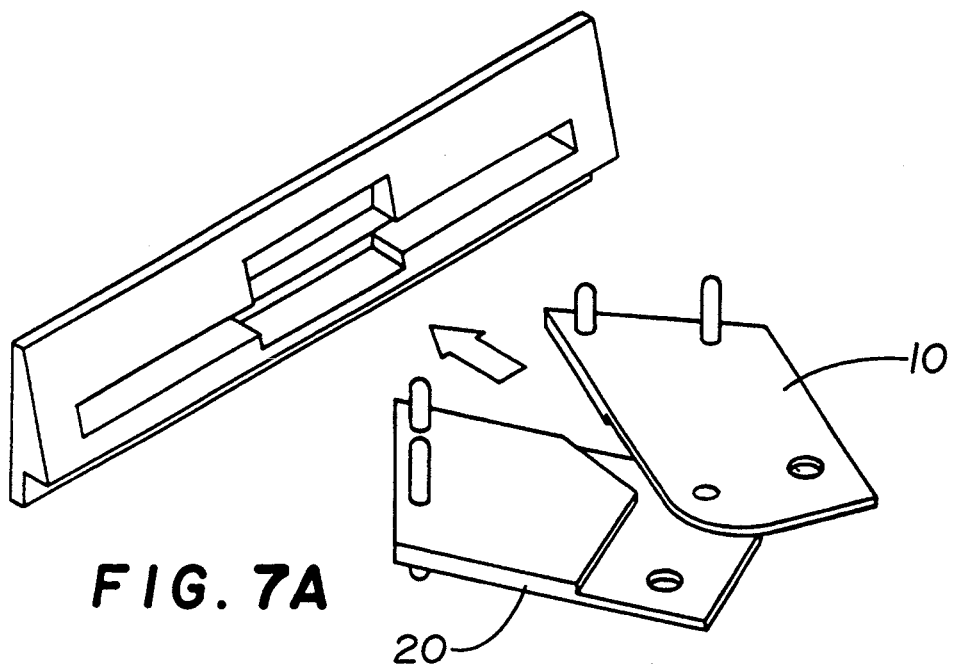
Figure 7B:
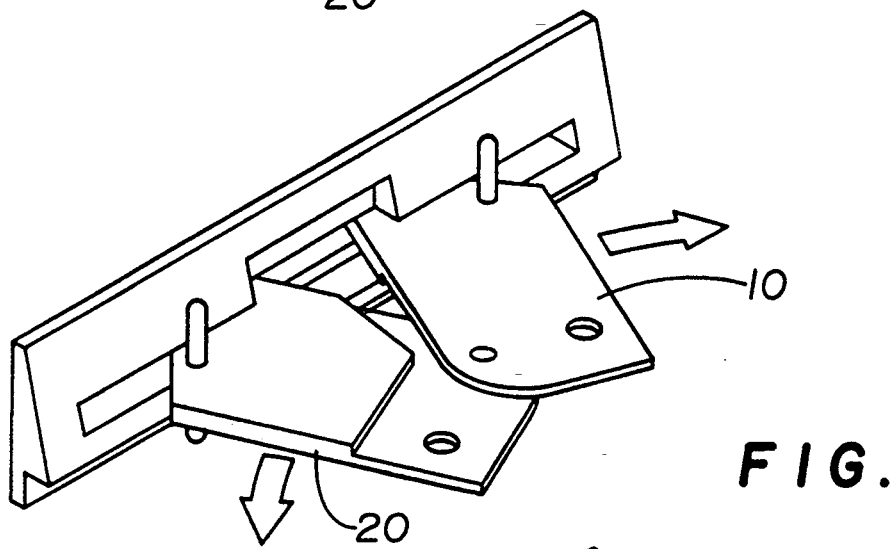
Figure 7C:
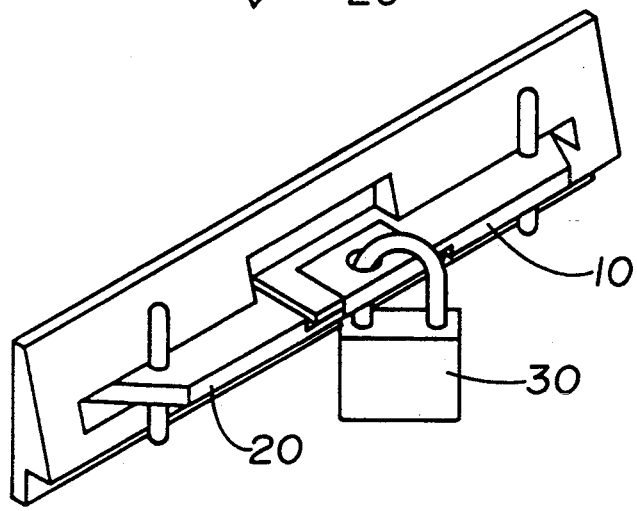

FIG. 7A–C is a top view of a three step insertion sequence of the disk drive lock of the present invention into a conventional disk drive, and FIG. 8A–B is a bottom view of the second two steps of the insertion sequence of FIG. 7A–C. Virtually all known conventional disk drives have elongate slot-like apertures formed with a central area of increased clearance. Lateral areas of reduced clearance flank both sides of the central area.

As shown in FIG. 7A, the disk drive lock is pivoted into a closed configuration and the tips of the slats 10 and 20 are inserted into the central area of the disk drive aperture. The shorter internal pins 12 and 14 are accepted into the disk drive as slats 10 and 20 are inserted. However, the longer external pins 16 and 18 are too large for the central area and prevent further insertion of the disk drive lock.

As shown in FIGS. 7B and 8A, the external pins 16 and 18 abut the outside surface of the disk drive and initiate self-opening of the slats 10 and 20.

As seen in FIG. 8A, continued opening of the slats 10 and 20 results in the shorter internal pins 12 and 14 becoming captive within the disk drive in the lateral areas of the aperture (which have reduced clearances).

As shown in FIGS. 7C and 8B, the length of the slats 10 and 20 conforms to the length of the disk drive aperture. Consequently, when the disk drive lock is fully opened it takes up substantially the entire disk drive aperture. The internal pins 12 and 14 remain captive within the disk drive, and the external pins 16 and 18 abut the exterior of the disk drive to prevent further insertion. The optional clip 50 may be applied at this time, and the padlock 30 is then clamped through the holes 24 and 26 in the slats 10 and 20. This prevents further pivoting, and the disk drive lock cannot be removed or further inserted into the disk drive without the key to the padlock 30.

FIG. 9 shows an additional feature of the invention which is especially useful for disk drives of portable computers such as laptops or notebooks. Portable computers are more prone to theft, and the disk drive lock of the present invention provides a convenient means for securing the computer to virtually any nearby fixture. This is accomplished in the manner of a bicycle lock with a link chain or cable. The chain or cable can be locked in a loop about a chair or table and attached at the ends by padlock 30 to thereby prevent theft.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A locking device for preventing unauthorized access to a computer disk drive, wherein the disk drive has a front face and further has an aperture for normal insertion of a floppy disk therein, and wherein the aperture is substantially in a horizontal plane, the locking device comprising a pair of articulated members having a first collapsed position and further having a second expanded position, such that the articulated members may be slidably inserted through the aperture in their first collapsed position and then moved laterally thereof within the plane of the aperture and into their second expanded position, and such that an externally-accessible portion of the articulated members extends outwardly of the aperture, first abutment means carried by the respective externally-accessible portions of the articulated members and engaging the front face of the disk drive, thereby limiting the insertion of the articulated members into the aperture in the disk drive, second abutment means carried by the articulated members and engaging the disk drive internally thereof to prevent removal of the articulated members from the disk drive while the articulated members are in their second expanded position therein, and removable locking means carried by the externally-accessible portion of the articulated members externally of the disk drive and preventing the articulated members from being moved from their second expanded position back into their first collapsed position and then slidably removed from the aperture in the disk drive.

2. A locking device for preventing unauthorized access to a computer disk drive comprising:
a pair of slats including a first slat pivotally hinged to a second slat for jackknife folding, said slats both being formed with lock-holes spaced from said hinge and together alignable to form an eye by unfolding said slats to an open position; and
a padlock attachable through said eye to prevent folding of said slats;
whereby said slats may be inserted lengthwise into the disk drive while in a folded position and unfolded within the disk drive to said open position and then locked in said open position by attachment of said padlock to prevent unauthorized removal from the disk drive,
whereby said slats are flat elongate members pivoted together at said hinge located at one end thereof,
wherein each slat has an end opposite said hinge, further comprising a pair of retaining pins each protruding transversely from a corresponding slat at the end opposite said hinge; said retaining pins being insertable into the disk drive along with said slats in the folded position and captured within the disk drive when unfolded therein,
wherein the disk drive has a disk drive aperture, further comprising a pair of insertion pins each protruding transversely from a corresponding slat proximate said retaining pin; said insertion pins being of greater extent than the disk drive aperture to limit insertion of said locking device therein.

3. The locking device according to claim 2, wherein said retaining pins are spaced further from said hinge than said insertion pins, such that said retaining pins are inside the disk drive when said insertion pins limit insertion of said locking device.

4. The locking device according to claim 3, wherein said retaining pins are laterally offset on opposing sides of said slats to allow unfolding of said slats while said retaining pins remain captured within the disk drive and said insertion pins are outside the disk drive.

5. A locking device for preventing access to a computer disk drive, the disk drive having an elongate aperture for insertion of a floppy disk, and said aperture being defined by a central area of greater clearance flanked by lateral areas of reduced clearance, said locking device comprising:
a pair of elongate slats including a first slat pivotally hinged to a second slat at overlapped ends for jackknife folding, said slats both being formed with holes offset from said hinge at the overlapped end and alignable to form an eye by unfolding said slats to an open position; and
a padlock insertable through said eye to prevent folding of said slats;
whereby said slats may be inserted lengthwise into the central area of the disk drive aperture while in a folded position and unfolded behind said lateral areas of reduced clearance to said open position, and then locked in said open position by insertion of said padlock to prevent unauthorized removal from the disk drive,
whereby said hinge further comprises a rivet,
further comprising a pair of retaining pins each protruding transversely from a corresponding slat at an end opposite said hinge; said retaining pins being insertable through the central area of the disk drive aperture along with said slats while in the folded position, and said retaining pins being captured behind the lateral areas of reduced aperture clearance when unfolded in the disk drive,
further comprising a pair of insertion pins each protruding transversely from a corresponding slat proximate said retaining pin; said insertion pins being of greater extent than the central area of the disk drive aperture to limit insertion of said locking device therein.

6. The locking device according to claim 5, wherein said retaining pins are spaced further from said hinge than said insertion pins, such that said retaining pins are inside the disk drive when said insertion pins limit insertion of said locking device.

7. The locking device according to claim 6, wherein said retaining pins are laterally offset on opposing sides of said slats to allow unfolding of said slats while said retaining pins remain captured within the disk drive and said insertion pins are outside the disk drive.

8. The combination of a disk drive for a personal computer and a locking device for preventing unauthorized access to the disk drive, wherein the disk drive has an internal abutment means and further has a front face provided with an elongated opening through which a floppy disk is inserted in a given direction, the elongated opening being disposed in a substantially horizontal plane, the locking device including a pair of planar elongated slats partially overlapped with each other, hinge means joining the slats together for movement about a pivot axis which is transverse to the elongated opening in the disk drive, such that the slats may be folded relative to each other, inserted into the elongated opening in the disk drive, and thereafter unfolded into a substantially aligned position, means carried by the slats and engaging the front face of the disk drive, thereby limiting the insertion of the slats into the elongated opening in the disk drive, each of the slats carrying a pin transverse to the plane thereof, such that when the slats are unfolded with respect to each other, the pins engage the internal abutment means in the disk drive and prevent the slats in the unfolded aligned position thereof from being removed from the disk drive, and each of the slats having a hole formed therein, the holes registering with each other about a locking axis in the unfolded aligned position of the slats, such that a padlock may be received within the registered holes, thereby preventing the slats from being pivoted and folded until the padlock is removed, and the locking axis of the registered holes and the pivot axis of the slats being disposed within a substantially vertical plane which is in the direction in which the floppy disk is inserted into the elongated opening in the disk drive and substantially perpendicular to the horizontal plane thereof.

* * * * *